(12) United States Patent
Yoh et al.

(10) Patent No.: US 7,194,053 B2
(45) Date of Patent: Mar. 20, 2007

(54) SYSTEM AND METHOD FOR MATCHING DATA AND CLOCK SIGNAL DELAYS TO IMPROVE SETUP AND HOLD TIMES

(75) Inventors: Gilbert Yoh, Fort Collins, CO (US); Manuel Salcido, Fort Collins, CO (US); Scott T. Evans, Ft. Collins, CO (US)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 859 days.

(21) Appl. No.: 10/046,597

(22) Filed: Dec. 18, 2001

(65) Prior Publication Data

US 2003/0112910 A1    Jun. 19, 2003

(51) Int. Cl.
*H04L 7/00*     (2006.01)
*G11C 27/02*    (2006.01)
*G11C 7/00*     (2006.01)

(52) U.S. Cl. .................. 375/356; 327/94; 365/194
(58) Field of Classification Search ............... 375/346, 375/356, 375, 354; 713/500; 327/94; 365/194
See application file for complete search history.

(56) References Cited

U.S. PATENT DOCUMENTS

| | | | | |
|---|---|---|---|---|
| 5,157,277 A | * | 10/1992 | Tran et al. ............... | 327/156 |
| 6,104,251 A | * | 8/2000 | Ramey et al. ............ | 331/14 |
| 6,240,524 B1 | * | 5/2001 | Suzuki ..................... | 713/500 |
| 6,532,544 B1 | * | 3/2003 | Masleid et al. .......... | 713/500 |
| 6,788,754 B1 | * | 9/2004 | Liepe ....................... | 375/375 |
| 2002/0023253 A1 | * | 2/2002 | Pasqualini ............... | 716/8 |
| 2002/0118563 A1 | * | 8/2002 | Keeth et al. .............. | 365/51 |
| 2002/0154718 A1 | * | 10/2002 | Fong et al. ............... | 375/354 |

\* cited by examiner

*Primary Examiner*—Khai Tran
*Assistant Examiner*—Cicely Ware

(57) ABSTRACT

A system and method for providing a clock signal and data signal delay match to improve setup and hold times for integrated circuits is disclosed. In a simplified embodiment, the system comprises a clock receiver capable of removing noise from a received clock signal. A clock buffer is connected to the clock receiver and is capable of driving the received clock signal to a register. A data receiver is located within the system which is capable of removing noise from received data. In addition at least one miniature clock buffer is located within the system, wherein the at least one miniaturized clock buffer is a scaled version of the clock buffer having a scaling factor of K, the scaling factor representing a number of miniature clock buffers utilized to minimize negative variations experienced by the clock buffer.

19 Claims, 4 Drawing Sheets

SYSTEM AND METHOD FOR MATCHING DATA AND CLOCK SIGNAL DELAYS TO IMPROVE SETUP AND HOLD TIMES

FIELD OF THE INVENTION

The present invention generally relates to integrated circuits and, more particularly, is related to improving setup and hold times of an integrated circuit.

BACKGROUND OF THE INVENTION

With advancements in technology, there is a constant need for increased computer processing speed and faster data transmission. Advanced design techniques for integrated circuits have attempted to address this need via the use of numerous different methods. One such method utilizes higher frequencies for data transmission. With the use of higher frequencies, the design of integrated circuits has moved from conventional clocking techniques to a newer scheme referred to as source synchronous data transfer.

Source synchronous data transfer transmits clock signals and bits of data via an integrated circuit memory and/or processor bus lines. Since the clock signal and data are linked during transmission between integrated circuits, any jitter, signal reflection, or other interference will affect both the clock signal and the data signal as a single entity, thereby ensuring that data is not lost between clock cycles. Therefore, newer generations of microprocessors utilize source synchronous data transfer techniques to increase processing and eliminate data transfer errors.

While source synchronous data transfer ensures that a data and a clock signal are transmitted simultaneously, transmission after reaching a destination integrated circuit (IC) is not controlled. Specifically, there is a difference between the arrival time of the clock signal and the arrival time for a data signal at an input register of a pad, or contact, located on the integrated circuit. The main cause of this difference is two-fold. First, there is a large propagation delay encountered between the input of a clock pad, where the clock signal is received, and a register intended to receive the clock signal. Second, there is also a delay encountered between the input of a data pad, where the data is received, and the register intended to receive the data. Unfortunately, the clock delay and data delay typically are not of the same in duration, thereby contributing to a lack of control of clock signal and data signal arrival times at the receiving register. It should be noted that, while synchronous data transfer transmits a clock signal and a data signal simultaneously, the clock signal and data signal do not arrive at the destination IC simultaneously.

It is well known in the art that it is not desirable for data to change during receipt by the receiving register. Likewise, it is also known that it is not desirable for a new clock signal to be received while a register is receiving data. Therefore, it is necessary to address these timing requirements.

While attempts may be made to compensate for these delays by skewing setup and hold times of the receiving register to reflect the delays, the uncertainty in the propagation of the clock signal and data signal associated with the register makes this method of compensation unsuccessful. Presently, standard cell delay elements are utilized in an attempt to match the delays of the clock signal and the data signal. Examples of these cell delay elements include, but are not limited to, two inverters in series following two weakened inverters, which are, in turn, followed by a large inverter. In addition, the clock path comprises a series of clock drivers, which are in series with stepped up symmetric buffers.

While adding the delay elements improves the setup and hold performance over the undelayed case, it still does not account for variations due to process, voltage and temperature (PVT) as well as unbalanced loading. In fact, architectural differences of the delay buffers causes substantial differences in their response to variations in PVT. This response difference leads to significant uncertainty in data and clock signal arrival times relative to each other, which can lead to larger setup and hold times for the receiving register, thereby resulting in slower data transmission.

SUMMARY OF THE INVENTION

In light of the foregoing, the preferred embodiment of the present invention generally relates to a system for providing a clock signal and data signal delay match to improve setup and hold times for integrated circuits.

Generally, with reference to the structure of the delay matching system, the system utilizes a clock receiver capable of removing noise from a received clock signal. A clock buffer, which is connected to the clock receiver, is utilized, and is capable of driving the received clock signal to a register. A data receiver capable of removing noise from received data is connected to at least one miniature clock buffer. The one miniature clock buffer is a scaled version of the clock buffer having a scaling factor of K, wherein the scaling factor represents a number of miniature clock buffers utilized to minimize negative variations experienced by the clock buffer.

The present invention can also be viewed as providing a method of matching data and clock signal delays within receive logic.

In this regard, the method can be broadly summarized by the following steps: minimizing setup and hold times of receive logic; formulating at least one miniaturized version of a clock buffer located within the receive logic, wherein the at least one miniaturized version of the clock buffer is a scaled version of the clock buffer having a scaling factor of K, the scaling factor representing a number of the miniaturized clock buffers utilized to minimize negative variations experienced by the clock buffer; and minimizing negative variations experienced by the clock buffer.

Other systems and methods of the present invention will be or become apparent to one with skill in the art upon examination of the following drawings and detailed description. It is intended that all such additional systems, methods, features, and advantages be included within this description, be within the scope of the present invention, and be protected by the accompanying claims.

BRIEF DESCRIPTION OF THE DRAWINGS

The invention can be better understood with reference to the following drawings. The components of the drawings are not necessarily to scale, emphasis instead being placed upon clearly illustrating the principles of the present invention. Moreover, in the drawings, like referenced numerals designate corresponding parts throughout the several views.

DETAILED DESCRIPTION OF THE PREFERRED EMBODIMENT

Figure 1:
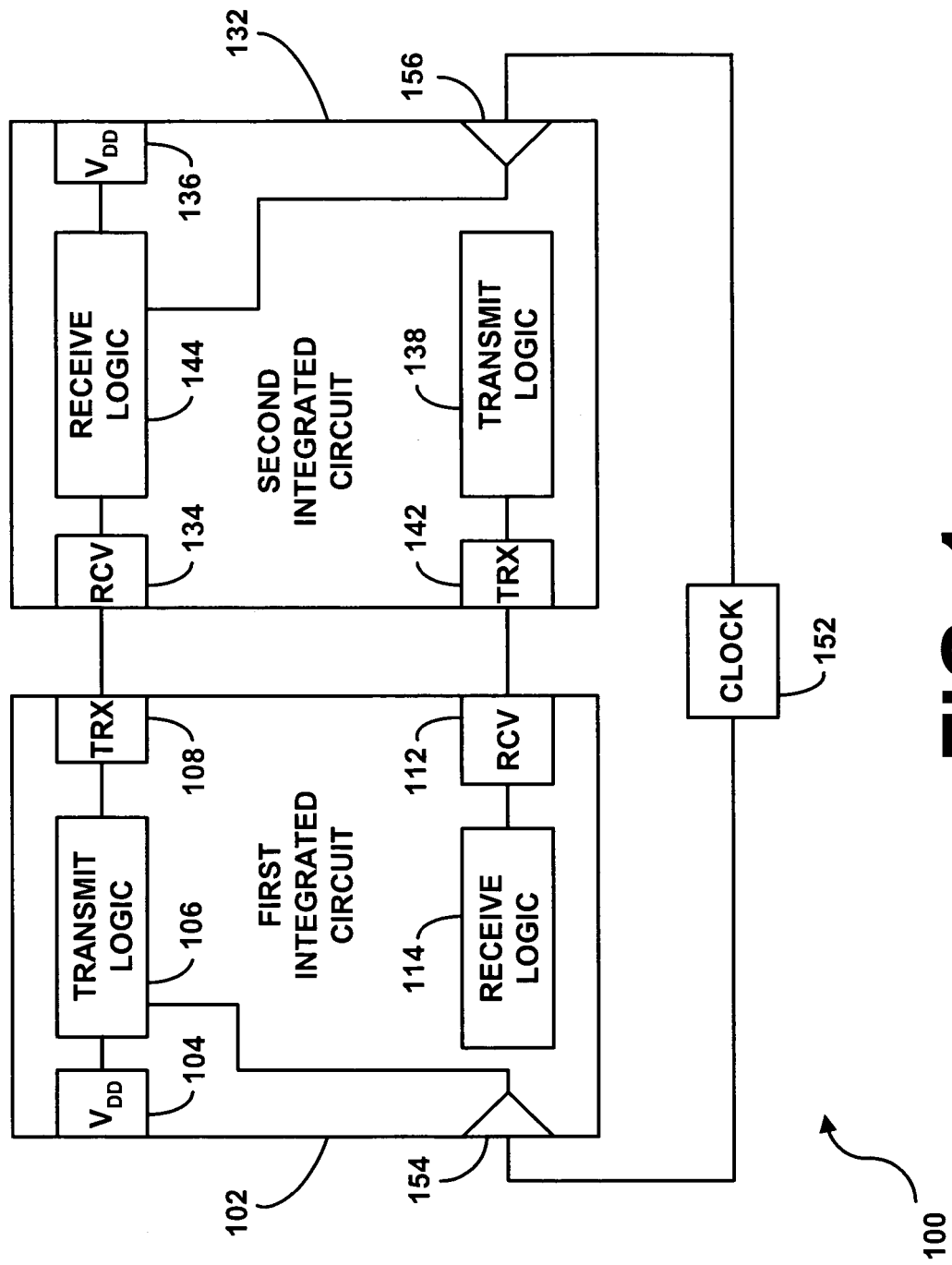
FIG. 1 is a block diagram illustrating a present delay matching system, comprising a first and a second integrated circuit in accordance with an embodiment of the invention.

Turning now to the drawings, wherein like reference numerals designate corresponding parts throughout the drawings, FIG. 1 is a block diagram illustrating a delay matching system 100 which comprises a first integrated circuit (IC) 102 and a second (IC) 132. The first IC 102 and the second IC 132 may be located on, for example, a printed circuit board (PCB) or an application specific integrated circuit (ASIC).

The first IC 102 comprises a first contact 104 labeled VDD via which an amount of power is provided that is appropriate to power the first IC 102. Transmit logic 106 is also located within the first IC 102 for purposes of transmitting data from the first IC 102 to the second IC 132, wherein the data may be stored within a storage (not shown). Transmission of the data is performed via a first transmit contact 108 that is connected to a second receive contact 134 located within the second IC 132. Data transmitted from the second IC 132 to the first IC 102 is received via a first receive contact 112 and transmitted to receive logic 114 located within the first IC 102. Receive logic 114 is further described herein with reference to FIG. 2.

The second IC 132 comprises a second contact 136 labeled $V_{DD}$ via which an amount of power appropriate to power the second IC 132 is provided. Transmit logic 138 is also located within the second IC 132 for purposes of enabling the transmission of data from the second IC 132 to the first IC 102. Transmission of data from the second IC 132 to the first IC 102 is performed via a second transmit contact 142 that is connected to the first receive contact 112 located within the first IC 102. Data transmitted from the first IC 102 to the second IC 132 is received via the second receive contact 134 and transmitted to receive logic 144 located within the second IC 132. The receive logic 144 is also further described herein with reference to FIG. 2.

A clock 152 is connected to the first IC 102, via a first clock pad 154, and to the second IC 132, via a second clock pad 156, for transmitting a clock signal to both the first IC 102 and the second IC 132, either in unison, or individually. It should be noted that the clock may instead be located within the first IC 102 or the second IC 132. In fact, the clock may even be located external to the present delay matching system 100 and simply be connected to the first IC 102 and the second IC 132.

Data and clock signals are transmitted via separate leads, wherein clock signals utilized by the first and second ICs 102, 132 may be shared with other ICs co-located with ICs 102 and 132. Sharing the clock signal with other co-located ICs may attribute to delay in receipt of the clock signal after transmission to either the first IC 102 or the second IC 132, since the co-located ICs may be positioned within a path to the first IC 102 or the second IC 132. Therefore, source synchronous data transmission is preferably utilized by the delay matching system 100 for the transmission of the clock signal and data signal to the first IC 102 or to the second IC 132. Use of the source synchronous data transfer technique ensures that the clock signal and the data signal are simultaneously transmitted to either the first IC 102 or the second IC 132, depending upon the direction of data transmission.

Although the use of source synchronous data transfer ensures that both the data signal and clock signal are transmitted to either the first IC 102, or the second IC 132, at the same time, delays within the ICs 102, 132 cause the data and clock signals to reach their destination within the ICs 102, 132 at different times.

Figure 2:
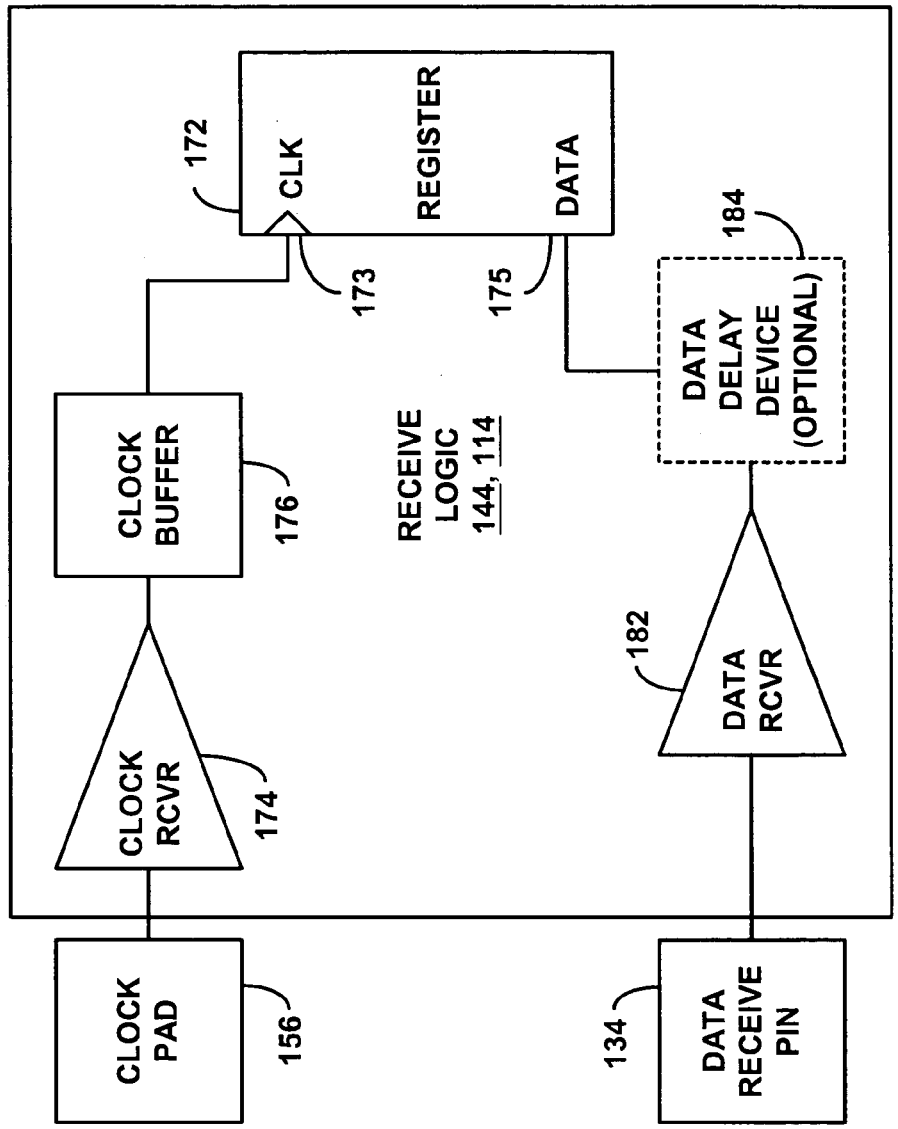
FIG. 2 is a block diagram further illustrating the receive logic of FIG. 1.

FIG. 2 is a block diagram that further illustrates the receive logic 144, 114 of FIG. 1. For ease of explanation and understanding, FIG. 2 is described with reference to the receive logic 144 located within the second IC 132. It should be noted, however, that the receive logic 114 located within the first IC 102 is substantially the same and, therefore, reference may be made to the following description of receive logic 144 for a description of the receive logic 114 located within the first IC 102.

As is illustrated by FIG. 2, the destination of the received data and clock signal is a register 172 having a clock input 173 and a data input 175. The clock signal that is received by the second clock pad 156 is first transmitted to a clock receiver 174. The clock receiver 174 is preferably a differential receiver that is utilized to perform differentiation of the received clock signal, thereby removing noise from the clock signal.

The clock signal is then transmitted to a clock buffer 176. The clock buffer 176 drives the clock signal by adding a gain factor to the received clock signal, thereby increasing the strength of the clock signal to allow proper propagation to the register 172. It should be noted that there may be more than one clock buffer 176 provided for purposes of providing gain. Unfortunately, associated with the clock buffer 176 is an amount of delay that slows progression of the clock signal in its path to the register 172. The clock signal is exposed to delay associated with propagation from the clock buffer 176 to the register 172.

Data received by the second data receive contact 134 is transmitted to a data receiver 182. The data receiver 182, similar to the clock receiver 174, is preferably a differential receiver that is utilized to remove noise from the received data signal.

A data delay device 184, such as, but not limited to, a delay buffer, or a series of delay buffers, can be utilized by the second IC 132 to improve timing between the clock signal and the data signal. Examples of such timing reasons include, but are not limited to, mimicking delay through a clock buffer 176 to the register 172. It should be noted that the second IC 132 may not require a data delay device 184.

As is known in the art, registers function by receiving data on edges of a clock signal. Thus it is desirable to synchronize receipt of the clock signal and data signal at the register 172. In attempting to synchronize receipt of the clock signal and data signal, both setup time and hold time of the register 172 should be considered.

Setup time is the minimum time required for a data signal received at the register 172 to be stable before the arrival of an edge of a clock signal, rising or falling, depending on the type of register 172, changes the state of the register 172. For explanation purposes, the following description assumes that the register 172 responds to rising edges of clock signals. Specifically, the register 172 analyzes and stores received data during a required setup time. Unfortunately, if the rising edge of a clock signal is not received during the setup time of the register 172, the register 172 stops storing data and the data is lost. Further, if the setup time is too long, then new data may be received prior to completion of initial data storage. Therefore, if the setup time is ignored, unpredictable behavior by the register 172 can be expected. This unpredictable behavior manifests in several ways including, but not limited to, missed data or ignored actions, and possible partial transient outputs of the register 172.

Hold time is the minimum time required for the data to remain stable, or valid, at the register 172 after a clock signal change so that the register 172 can safely capture data. An example of a clock signal change is the receipt of a new rising edge of a clock signal. As with the setup time, if the hold time is ignored, unpredictable behavior can result. As an example, if the hold time is too long data received by the register 172 may change in value resulting in unstable data and a lack of recognition by the register 172.

Figure 3:
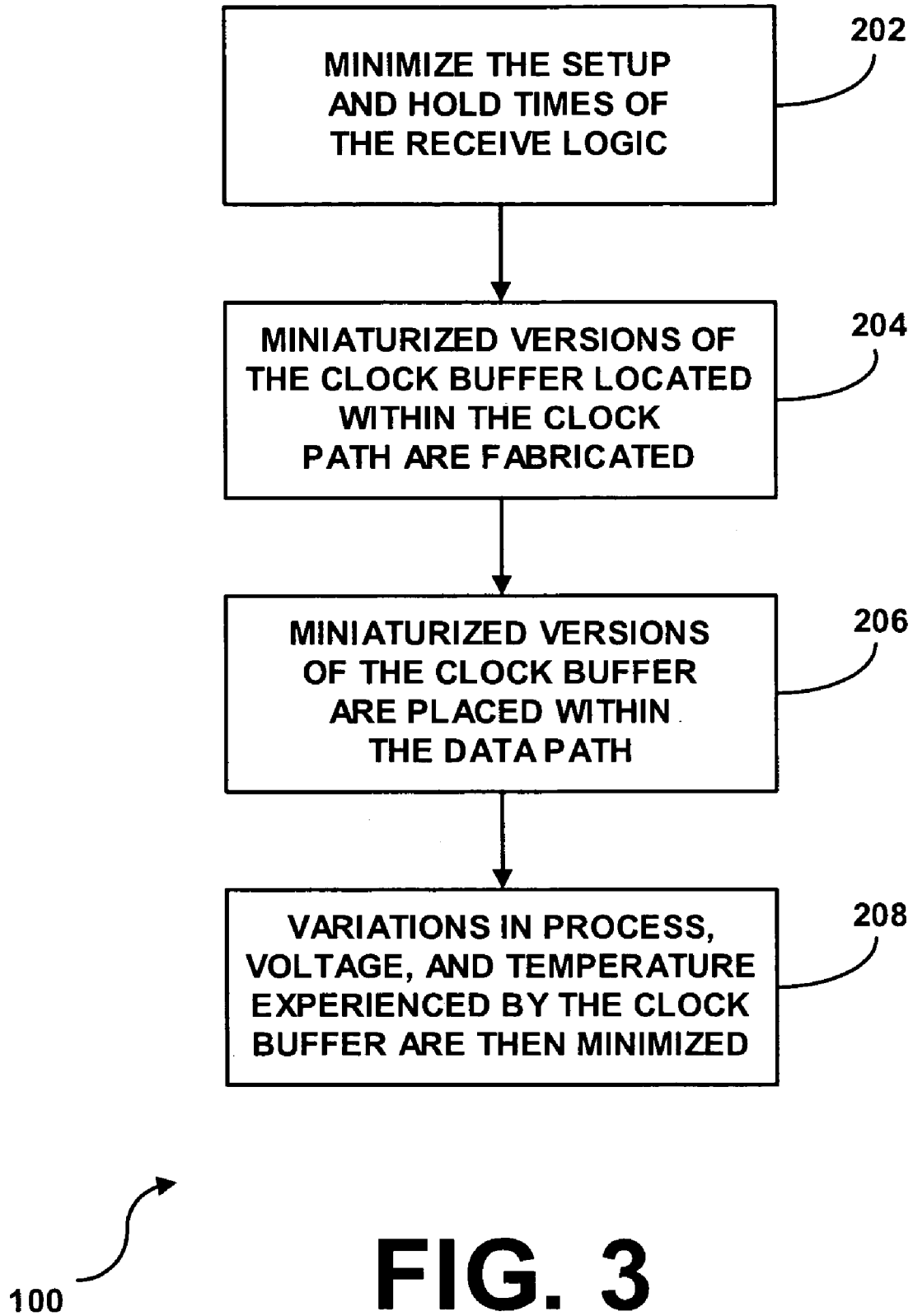
FIG. 3 is a flow chart that shows the architecture, functionality, and operation of a possible implementation of the delay matching system of FIG. 1.

FIG. 3 is a flow chart that shows the architecture, functionality, and operation of a possible implementation of the delay matching system 100. In this regard, each block represents a module, segment, or portion of code, which comprises one or more executable instructions for implementing the specified logical function(s). It should also be noted that in some alternative implementations, the functions noted in the blocks may occur out of the order noted. For example, two blocks shown in succession may in fact be executed substantially concurrently or the blocks may sometimes be executed in the reverse order, depending upon the functionality involved, as will be further clarified hereinbelow.

As is shown by block 202, the setup and hold times of the receive logic 144 are minimized. Miniaturized versions of the clock buffer 176 located within the clock path are then fabricated (block 204). As is shown by block 206, the miniaturized versions of the clock buffer 176 are then placed within the data path to the register 172. Variations in process, voltage and temperature experienced by the clock buffer 176 are then minimized (block 208). Each of these steps is described in detail below.

Returning to FIG. 2, to increase processing speed of the register 172 it is desirable to minimize both setup time and hold time of the receive logic 144. It should be noted that there is a difference between the setup time of the receive logic 144 (referred to as $T_{setup}$) and hold time of the receive logic (referred to as $T_{hold}$) and required minimum setup time of the register 172 (referred to as $T_{reg-setup}$) and hold time of the register (referred to as $T_{reg-hold}$).

The required minimum setup time of the register 172 ($T_{reg-setup}$) is the minimum amount of time required for the data to be received at the register 172 before the clock signal is received at the register, so that the data may be properly stored and/or analyzed by the register 172.

The required minimum hold time of the register 172 ($T_{reg-hold}$) is the minimum amount of time required by the register 172 for the data to remain stable after the clock signal is received by the register 172.

The setup and hold times of the receive logic 144, $T_{setup}$ and $T_{hold}$ respectively, may be expressed in terms of a delay attributed to the clock receiver 174 ($T_{clk-rcv}$), clock buffer 176 ($T_{clk-dly}$), data receiver 182 ($T_{data-rcv}$), data delay device 184 ($T_{data-dly}$), and propagation of the clock signal ($T_{clk-rte}$). Equation one, provided below, demonstrates the setup time of the receive logic 144 in terms of delay.

$$T_{setup} = T_{data-arrival} - T_{clk-arrival} + T_{reg-setup} \quad \text{(Eq. 1)}$$
$$= T_{data-rcv} + T_{data-dly} - T_{clk-rcv} - T_{clk-dly}$$
$$- T_{clk-rte} + T_{reg-setup}$$

Herein, $T_{data-arrival}$ is the arrival time of data at the register 172. For the setup time, the arrival time of data at the register 172 is prior to the clock signal arriving at the register 172 plus the setup time for the register 172. This is equivalent to the delay contributed by the data receiver 182, plus delay contributed by the data delay device 184, minus the delay contributed by clock receiver 174, minus the delay contributed by the propagation of the clock signal, minus the delay contributed by the clock buffer 176, plus the minimum setup time for the register 172. Ideally, the only delay observed by the receive logic 144 is the minimum setup and hold time of the register 172, thereby allowing the second IC 132 to operate at optimal speed due to a lack of internal delay.

Equation two, provided below, demonstrates the hold time of the receive logic 144 in terms of delay.

$$T_{hold} = T_{clk-arrival} - T_{data-arrival} + T_{reg-hold} \quad \text{(Eq. 2)}$$
$$= T_{clk-rcv} + T_{clk-dly} + T_{clk-rte} - T_{data-rcv}$$
$$- T_{data-dly} + T_{reg-hold}$$

Herein, $T_{clk-arrival}$ is the arrival time of the clock signal at the register 172. For the hold time, the arrival time of the clock signal at the register 172 is prior to the data arriving at the register 172, plus the hold time for the register 172. This is equivalent to the delay contributed by the clock receiver 174, plus delay contributed by the clock buffer 176, plus delay contributed by propagation of the clock signal, minus delay contributed by the data receiver 182, minus delay contributed by the data delay device 184, plus the minimum hold time for the register 172.

In accordance with the preferred embodiment of the invention, there is no data delay device 184 utilized for delaying data transmission to the register 172. Therefore, the delay contributed by the data delay device ($T_{data-dly}$) is removed from Eq. 1 and Eq. 2. Further, since the clock and data receivers 174, 182 are identical, their corresponding delays, $T_{clk-rcv}$ and $T_{data-rcv}$ respectively, are also removed from equations one and two. The setup time of the receive logic 144 is represented by equation three provided below.

$$T_{setup} = T_{reg-setup} - T_{clk-dly}(\min) - T_{clk-rte}(\min) \quad \text{(Eq. 3)}$$

In addition, the hold time of the receive logic 144 is represented by equation four provided below.

$$T_{hold} = T_{reg-hold} + T_{clk-dly}(\max) + T_{clk-rte}(\max) \quad \text{(Eq. 4)}$$

To derive setup and hold times of the receive logic 144 that are closest to the ideal situation where the only delay experienced by the receive logic 144 is the delay attributed to setup and hold time of the register 172, a worst case scenario is assumed. In accordance with the worst case scenario, a worst case setup time and a worst case hold time is assumed, specifically, wherein the setup time and the hold time are largest. Therefore, if a delay is added to derive the setup and hold times of the receive logic 144, the maximum value of the delay is desired. Alternatively, if a delay is subtracted to derive the setup and hold times of the receive logic 144, the minimum value of delay is desired.

To further remove delays from the setup and hold times for the receive logic 144, it is desirable to build a data delay device that tracks the delay of the clock buffer 176. Tracking provides a means for minimizing the setup and hold times for the receive logic 144 by removing the delay of the clock buffer 176 from Eq. 3 and Eq. 4. Such delay tracking is performed by a miniaturized version of the clock buffer 176 that places the same number of buffers in the data path as the number of clock buffers 176 in the clock signal path. As an example, if there are two clock buffers 176 located in the clock signal path, two miniature clock buffers are placed in the data path. The miniature clock buffers are a scaled version of the original clock buffer 176 having a scaling factor of K.

Figure 4:
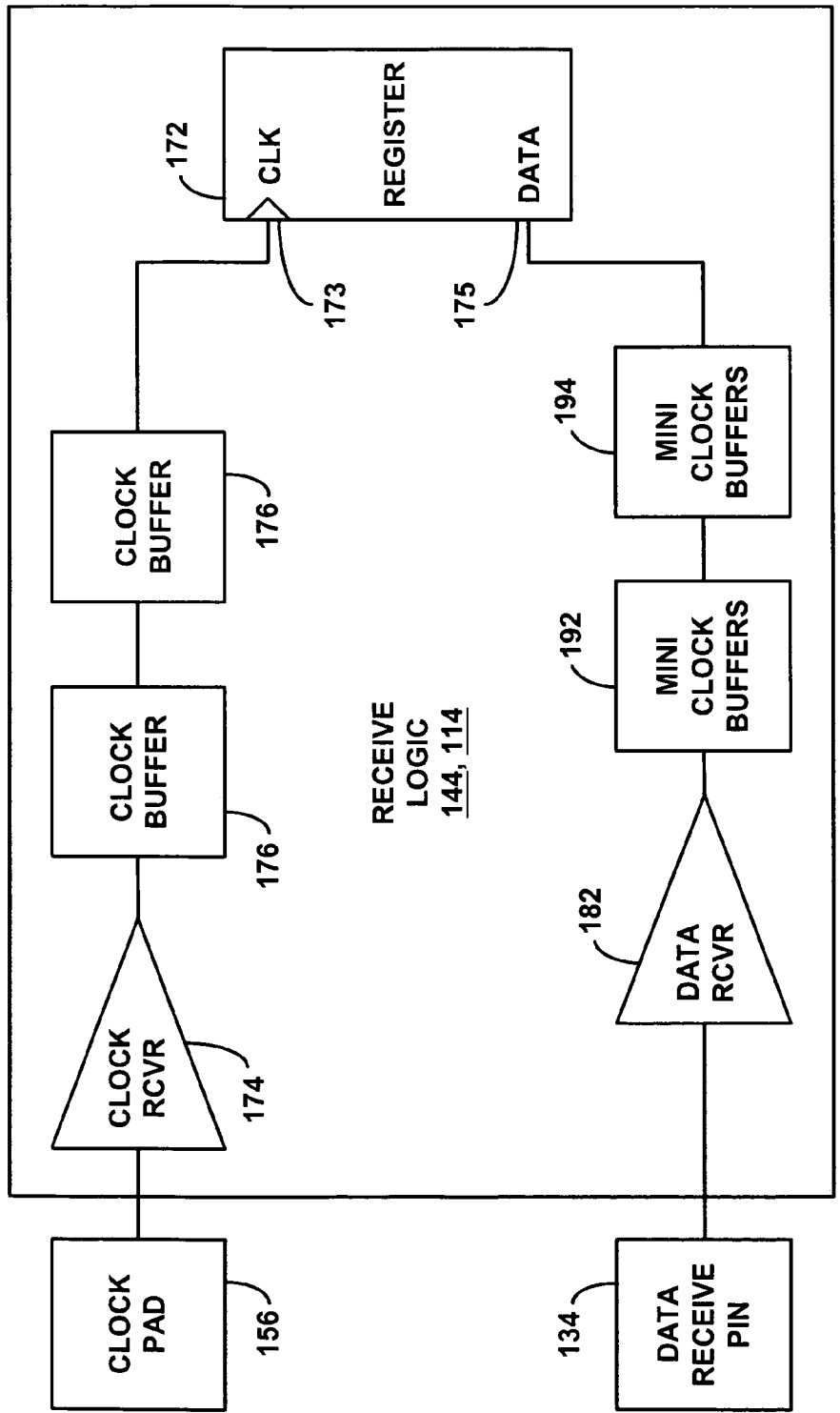
FIG. 4 is a block diagram further illustrating the receive logic of FIG. 2 comprising miniature clock buffers within the data path.

FIG. 4 is a block diagram further illustrating receive logic 144 comprising a first and second miniature clock buffer 192, 194 in the data path equal to the number of clock buffers 176 located in the clock path. It should be noted that any circuit fabrication software may be utilized to design the miniature clock buffers 192, 194 by scaling down the size of the original clock buffer 176. The miniature clock buffers 192, 194 are a scaled down version of the original clock buffer 176 because the original clock buffer 176 is too large and consumes too much power to simply be placed in the data path. If the clock buffer 176 were introduced into the data path for delay purposes, noise would be introduced into the data path since excess voltage is needed to power the clock buffer 176.

To assist in matching the delay of the clock path to the delay of the data path, a load is placed onto each of the miniature clock buffers 192, 194. These loads are scaled versions of the load placed on the corresponding clock buffer 176. As a result, architecturally, the delay paths are identical. Unfortunately, the clock buffer 176 is subjected to variations in process, voltage, and temperature which affect performance of the clock buffer 176. This variation presents an obstacle in determining properties of the miniature clock buffers 192, 194 since the variations imposed upon the clock buffer 176 are to be duplicated by the miniature clock buffers 192, 194 to ensure proper tracking of the clock buffer 176. Therefore, it is desirable to minimize the variations in process, voltage, and temperature experienced by the clock buffer 176.

To reduce the effects of process variations, non-minimum length transistors may be utilized by the clock buffer 176. In addition, utilizing K (the scaling factor) miniature clock buffers in the data path ensures that the correct scaling factor is utilized while guaranteeing identical artwork, which also helps alleviate process variation. To reduce voltage variations, such as, but not limited to, power spikes, local bypass capacitors may be added to the circuitry utilized in the fabrication of the miniature clock buffers 192, 194.

Unfortunately, temperature variations, which add approximately ten percent of uncertainty to circuit timing, are not currently capable of being compensated for. Therefore, the delay contributed by the clock buffer 176 is multiplied by one hundred ten percent (1.1) to account for this variation. The resulting setup and hold delays for the receive logic 144 are shown by equations five and six provided hereinbelow.

$$T_{setup} = T_{reg\text{-}setup} + 1.1 \times (-T_{clk\text{-}dly}) - T_{clk\text{-}rte}(\min) \quad \text{(Eq. 5)}$$

$$T_{hold} = T_{reg\text{-}hold} + 1.1 \times (T_{clk\text{-}dly}) + T_{clk\text{-}rte}(\max) \quad \text{(Eq. 6)}$$

It should be noted that the delay contributed by clock signal propagation is quite small, and therefore is not minimized further. Therefore, by reducing the delay of the clock buffer 176 by ten percent and utilizing miniature clock buffers 192, 194 within the data path, the receive logic is optimized by decreasing associated delay.

Therefore by utilizing equations five and six, the required set up and hold times for the receive logic 144 can be determined. As mentioned above, if the worst case set up and hold times of the receive logic 144 are known, set up and hold times of the receive logic 144 that are closest to the ideal situation may be determined solely by the setup and hold times of the register 172.

It should be noted that the delay matching system of the present invention can be implemented in software, firmware, hardware, or a combination thereof. In the preferred embodiment of the invention, which is intended to be a non-limiting example, the system is implemented in hardware. However, assuming that a portion of the system is implemented in software, the software may be executed by a computer, for example, but not limited to, a server, a personal computer, work station, minicomputer, or main frame computer.

The software based portion of the delay matching system, which comprises an ordered listing of executable instructions for implementing logical functions, can be embodied in any computer-readable medium for use by, or in connection with, an instruction execution system, apparatus, or device such as a computer-based system processor containing system, or other system that can fetch the instructions from the instruction execution system, apparatus, or device and execute the instructions. In the context of this document, a "computer-readable medium" can be any means that can contain, store, communicate, propagate or transport the program for use by or in connection with the instruction execution system, apparatus or device.

The computer-readable medium can be, for example, but not limited to, an electronic, magnetic, optical, electromagnetic, infrared, or semiconductor system, apparatus, device, or propagation medium. More specific examples (a non-exhaustive list) of the computer-readable medium would include the following: an electrical connection (electronic) having one or more wires, a portable computer diskette (magnetic), a random access memory (RAM) (magnetic), a read-only memory (ROM) (magnetic), an erasable programmable read-only memory (EPROM or Flash memory) (magnetic), an optical fiber (optical), and a portable compact disk read-only memory (CD ROM) (optical). Note that the computer-readable medium could even be paper or another suitable medium upon which the program is printed, as the program can be electronically captured, via for instance, optical scanning of the paper or other medium, then compiled, interpreted or otherwise processed in a suitable manner, if necessary, and then stored in a computer memory.

It should be emphasized that the above-described embodiments of the present invention, particularly, any "preferred" embodiments, are merely possible examples of implementations, merely set forth for a clear understanding of the principles of the invention. Many variations and modifications may be made to the above-described embodiment(s) of the invention without departing substantially from the spirit and principles of the invention. All such modifications and variations are intended to be included herein within the scope of this disclosure and the present invention and protected by the following claims.

The following is claimed:

1. A method of matching data and clock signal delays within receive logic, comprising the steps of:

minimizing setup and hold times of said receive logic;

formulating at least one miniaturized version of a clock buffer located within said receive logic, wherein said at least one miniaturized version of said clock buffer is a scaled down version of said clock buffer, said miniaturized version of said clock buffer having a scaling factor of K, said scaling factor representing a number of said miniaturized clock buffers utilized to minimize negative variations experienced by said clock buffer; and minimizing negative variations experienced by said clock buffer.

2. The method of claim 1, wherein said receive logic is situated on an application specific integrated circuit.

3. The method of claim 1, wherein said negative variations are selected from a group consisting of process, voltage and temperature.

4. The method of claim 1, wherein said clock buffer is capable of driving a received clock signal to a register located within said receive logic.

5. The method of claim 4, wherein a setup time of said receive logic is represented by the equation:

$$T_{setup} = T_{reg\text{-}setup} + 1.1 \times (-T_{clk\text{-}dly}) - T_{clk\text{-}rte}(\min)$$

wherein, $T_{reg\text{-}setup}$ is a setup time for said register, $T_{clk\text{-}dly}$ is a delay contributed by said clock buffer, and $T_{clk\text{-}rte}(\min)$ is a minimum delay contributed by propagation of said clock signal to said register.

6. The method of claim 4, wherein a hold time of said receive logic is represented by the equation:

$$T_{hold} = T_{reg\text{-}hold} + 1.1 \times (T_{clk\text{-}dly}) + T_{clk\text{-}rte}(\max)$$

wherein, $T_{reg\text{-}hold}$ is a hold time for said register, $T_{clk\text{-}dly}$ is a delay contributed by said clock buffer, and $T_{clk\text{-}rte}(\max)$ is a maximum delay contributed by propagation of said clock signal to said register.

7. The method of claim 1, wherein said clock buffer provides an amount of delay that slows progression of said clock signal in a path to a register located within said receive logic.

8. A system for matching data and clock signal delays within receive logic, comprising:

means for minimizing setup and hold times of said receive logic;

means for formulating at least one miniaturized version of a clock buffer located within said receive logic, wherein said at least one miniaturized version of said clock buffer is a scaled down version of said clock buffer, said miniaturized version of said clock buffer having a scaling factor of K, said scaling factor representing a number of said miniaturized clock buffers utilized to minimize negative variations experienced by said clock buffer; and means for minimizing negative variations experienced by said clock buffer.

9. The system of claim 8, wherein said receive logic is situated on an application specific integrated circuit.

10. The system of claim 8, wherein said negative variations are selected from a group consisting of process, voltage and temperature.

11. The system of claim 8, wherein said clock buffer is capable of driving a received clock signal to a register located within said receive logic.

12. The system of claim 11, wherein a setup time of said receive logic is represented by the equation:

$$T_{setup} = T_{reg\text{-}setup} + 1.1 \times (-T_{clk\text{-}dly}) - T_{clk\text{-}rte}(\min)$$

wherein, $T_{reg\text{-}setup}$ is a setup time for said register, $T_{clk\text{-}dly}$ is a delay contributed by said clock buffer, and $T_{clk\text{-}rte}(\min)$ is a minimum delay contributed by propagation of said clock signal to said register.

13. The system of claim 11, wherein a hold time of said receive logic is represented by the equation:

$$T_{hold} = T_{reg\text{-}hold} + 1.1 \times (T_{clk\text{-}dly}) + T_{clk\text{-}rte}(\max)$$

wherein, $T_{reg\text{-}hold}$ is a hold time for said register, $T_{clk\text{-}dly}$ is a delay contributed by said clock buffer, and $T_{clk\text{-}rte}(\max)$ is a maximum delay contributed by propagation of said clock signal to said register.

14. A system comprising:

a register having a clock input and a data input;

a clock receiver for receiving a clock signal;

at least one clock buffer for driving the clock signal to the register;

a data receiver for receiving a data signal; and at least one data delay device;

wherein the at least one data delay device is configured to substantially match the delay of the clock signal from the clock receiver to the clock input of the register with the delay of the data signal from the data receiver to the data input of the register; and wherein each of the at least one data delay device is a scaled down version of the at least one clock buffer with respect to size, power, and load.

15. The system of claim 14, wherein the at least one data delay device is configured to mimic the delay of the at least one clock buffer.

16. The system of claim 14, wherein the number of the at least one data delay device is equal to the number of the at least one clock buffer.

17. The system of claim 14, wherein the delay of the at least one clock buffer is subject to variations, and the at least one data delay device is configured to duplicate the variations.

18. The system of claim 14, further comprising a setup time represented by the equation:

$$T_{setup} = T_{reg\text{-}setup} + 1.1 \times (-T_{clk\text{-}dly}) - T_{clk\text{-}rte}(\min)$$

wherein, $T_{reg\text{-}setup}$ is a setup time for the register, $T_{clk\text{-}dly}$ is a delay contributed by the at least one clock buffer, and $T_{clk\text{-}rte}(\min)$ is a minimum delay contributed by propagation of the clock signal to the register.

19. The system of claim 14, further comprising a hold time represented by the equation:

$$T_{hold} = T_{reg\text{-}hold} + 1.1 \times (T_{clk\text{-}dly}) + T_{clk\text{-}rte}(\max)$$

wherein, $T_{reg\text{-}hold}$ is a hold time for the register, $T_{clk\text{-}dly}$ is a delay contributed by the at least one clock buffer, and $T_{clk\text{-}rte}(\max)$ is a maximum delay contributed by propagation of the clock signal to the register.

* * * * *